UNITED STATES PATENT OFFICE.

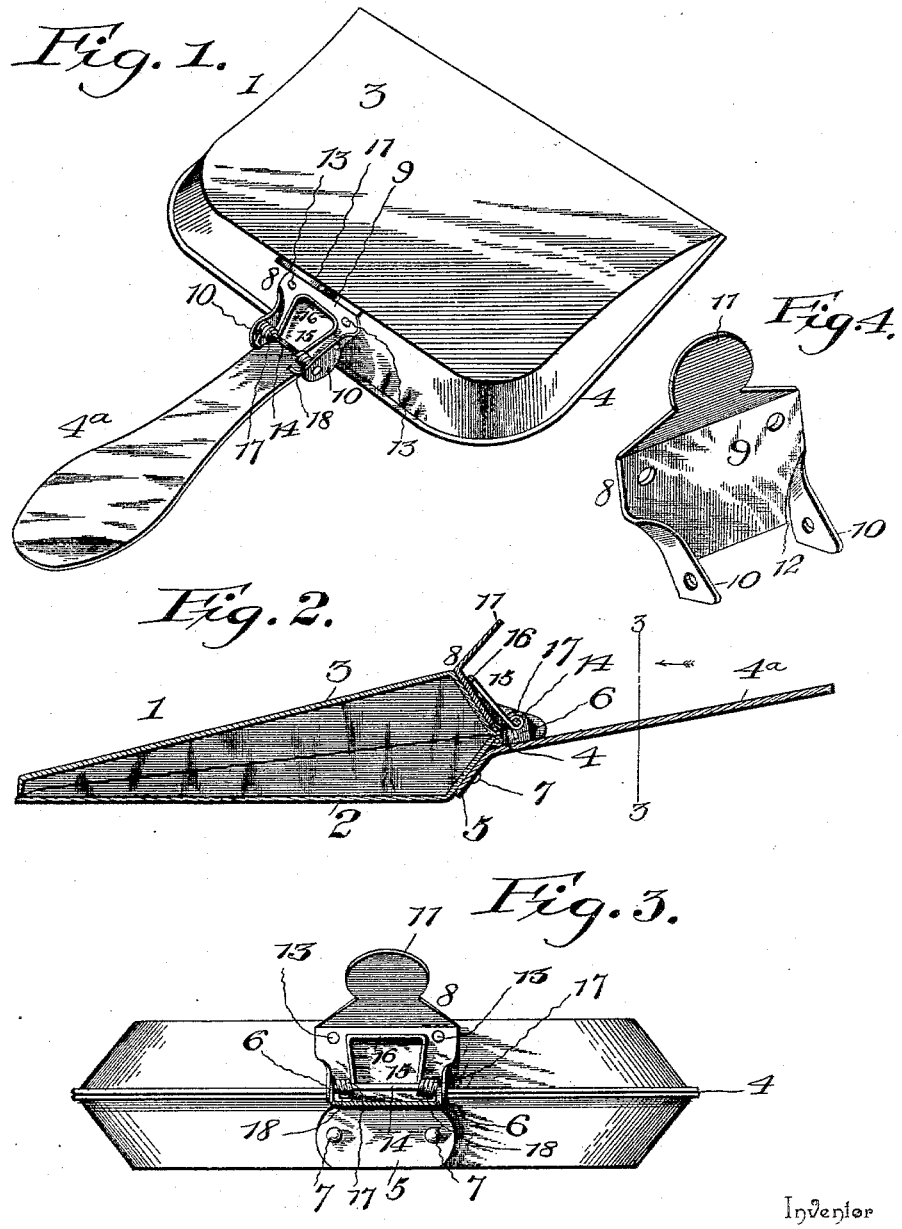

HENRY KOHLMYER, OF LORAIN, OHIO.

DUST-PAN.

SPECIFICATION forming part of Letters Patent No. 597,986, dated January 25, 1898.

Application filed September 17, 1897. Serial No. 652,025. (No model.)

*To all whom it may concern:*

Be it known that I, HENRY KOHLMYER, a citizen of the United States, residing at Lorain, in the county of Lorain and State of Ohio, have invented a new and useful Dust-Pan, of which the following is a specification.

My invention relates to improvements in dust-pans; and the object that I have in view is to provide an improved construction by which the contents of the pan may be confined within the structure when it is carried out into the open air and exposed to the wind, thus obviating the necessity of throwing the sweepings into the fire or of keeping them in the house in windy weather.

A further object of the invention is to provide an improved means by which the upper section of the pan may be readily lifted for the purpose of opening the pan and emptying its contents, and said adjusting device also furnishes a convenient means for the attachment of the upper section or member of the pan to the handle fastened to the lower section of said pan.

With these ends in view the invention consists in the novel construction and combination of parts, which will be hereinafter fully described and claimed.

To enable others to understand the invention, I have illustrated the preferred embodiment thereof in the accompanying drawings, forming a part of this specification, and in which—

Figure 1 is a perspective view of a dust-pan constructed in accordance with my invention. Fig. 2 is a vertical longitudinal sectional view taken through the pan and the hinge connection between the members of said pan. Fig. 3 is a transverse section on the plane indicated by the dotted line 3 3 and looking in the direction indicated by the arrow. Fig. 4 is a detail perspective view of the clip detached from the upper section of the pan and from the handle.

Like numerals of reference denote corresponding parts in all the figures of the drawings.

1 designates the pan. It consists of complemental upper and lower sections 2 3, each of which is stamped or struck up from a single piece of sheet metal to form a boundary-flange 4 around the side and back edges of the said section or member of the pan. If desired, the edge of the pan, at the side and back thereof, may be reinforced by a wire secured within a folded edge of the pan-section, as is usual to the art. These sections of the pan are of corresponding form and size, and the section 3, which constitutes the upper half of the pan, is inverted over the lower section 2 in a manner to have the boundary-flanges of the two sections lap one another and form a close joint between the sections of the pan.

A handle 4ª is united rigidly to the lower section or half 2 of the pan. This handle is preferably struck up from a single piece of sheet metal. In the drawings the handle is shown of flat shape, but it is evident that the shape may be changed to suit the convenience of the operator in grasping it—as, for instance, the handle may be rounded or tubular. This sheet-metal handle is provided at its inner end with a broad plate 5, and at an intermediate point of its length said handle is formed with ears 6, said broad plate 5 and ears 6 being struck up from sheet metal with the handle, so that all of the parts are integral one with the other. The broad plate 5 is bent at an obtuse angle to the axis of the handle 4ª for the purpose of applying said plate snugly against the upturned rear wall of the lower section or half of the pan, and said plate of the handle is united rigidly to the pan-section 2 by rivets 7, which pass through suitable apertures in the pan-section and the plate, although the handle may be attached to the pan in any other suitable way. The ears or lugs 6 are provided on opposite sides of the handle and at points close to the rear edge of the pan-sections, said ears being bent at right angles to the handle and projecting upwardly from the handle and above the line of juncture between the two parts or halves of the pan.

To provide a means for conveniently connecting the pan-sections at the rear edge thereof and to enable the operator to readily lift the upper section of the pan, I employ the clip 8. (Shown more clearly by Fig. 4 of the drawings.) This clip is struck up from a single piece of sheet metal to form a suitable blank designed to be bent into the clip shown by the drawings. Said clip consists of a flat plate 9, having the arms 10 and the thumb-piece 11. The arms 10 are integral with the plate, but are separated from the sides of the plate by the kerfs or incisions 12, and said arms 10 are bent at points where they join with the plate, so that the rear extremities of the arms may be applied laterally and snugly against the lugs or ears 6 on the handle. The plate 9 of the clip is applied laterally against the rear boundary-wall of the upper section or half 3 of the pan, and the clip and pan-section 3 are united firmly together by means of rivets 13, which pass through suitable apertures in the clip-plate 9 and the pan-section 3, thus uniting the clip firmly and solidly to the pan. The thumb-piece 11 is bent at an obtuse angle to the clip-plate 9, and it extends outwardly and rearwardly from the upper edge of said plate and from the pan, thus exposing said thumb-piece to enable the operator to readily grasp the same and elevate the pan-section 3 as may be required. The arms 10 of the clip-plate and the lugs or ears 6 of the handle are pivotally attached together by means of the spindle, pin, or bolt 14, which passes through alined openings in said ears and arms, one end of said spindle or pin being headed to bear against one arm 10, while the other arm of the spindle or pin is bent or provided with a suitable fastener. The described construction provides a very firm hinge-support for the upper section of the pan on the inner part of the handle to enable the operator by depressing the thumb-piece to lift the upper section of the pan, and thus open the device for easily emptying the sweepings therefrom.

The upper section of the pan is normally closed by the gravity of said section 3, assisted by the action or recoil of a pressure-spring 15. This pressure-spring is bent from a single piece of strong elastic wire, and said wire is first bent to form the loop or bail 16, then it is coiled to form the eyes or coils 17, and finally the ends are extended to form the arms 18. In applying the spring to the pan it is placed between the ears 6 of the handle to have its coils or eyes 17 in alinement with the apertures in said lugs and in the arms 10 of the clip, and through said coils of the spring passes the spindle or pin 14, the latter thus serving as a means for holding the spring in place and as the pintle for the hinge connection between the upper pan-section 3 and the handle 4ᵃ of the implement. The spring is adjusted to have its bail or loop 16 bear against the clip-plate 9, while the free ends or arms 18 of said spring are seated upon the handle 4ᵃ in compact or snug relation to the ears 6 of said handle.

It is thought that the operation and the advantages of my improved dust-pan will be readily understood from the foregoing description, taken in connection with the drawings.

I desire to remark that the described construction of the clip-plate provides a firm hinged support for the upper section of the pan, because the arms of the clip-plate lap the ears or lugs of the handle, and the spindle or pin is connected with the handle and the clip-plate in a manner to overcome any tendency of the parts to lateral displacement.

By making the clip-plate from a single piece of sheet metal I am enabled to cheapen the manufacture of the device, because the clip-plate may be struck up from a single piece of metal, and it may be readily assembled and attached to the upper pan-section and to the handle.

Various slight changes in the form and proportion of parts may be made without departing from the spirit or sacrificing any of the advantages of the invention.

Having thus described the invention, what I claim as new is—

1. The combination with a sectional pan and a handle, of a clip-plate fastened to the upper section of the pan and pivoted to the handle and provided with an operating-piece, for the purposes described substantially as set forth.

2. The combination with a sectional pan, of a handle fastened to one section and provided with ears or lugs, a clip-plate having integral arms and a thumb-piece and fastened to the other section of the pan to have its arms lie adjacent to the ears or lugs of the handle, and a pintle or spindle passing through the arms of the clip-plate and the ears or lugs of the handle, substantially as described for the purposes set forth.

3. The combination with a sectional pan, and a handle attached to one section of the pan, of a clip-plate provided with an operating-piece and attached to the other section of the pan, a pintle for pivotally connecting the clip-plate to the handle, and a spring supported by the clip-plate and bearing against the handle and against the pan-section to which the clip-plate is attached, substantially as described.

4. In a dust-pan, a clip-plate struck up from a single piece of metal with angular arms 10 and an offstanding operating-piece 11, in combination with a pan having its upper section attached to the clip-plate, a handle attached to the lower section of the pan, a pintle to pivotally connect the clip-plate and the handle, and a pressure-spring seated against the upper pan-section to normally depress the latter, substantially as described.

5. A dust-pan comprising complemental upper and lower sections, each struck up from a single piece of metal and provided with a boundary-flange, one section of the pan being inverted over the other section, and the flanges of said sections arranged to lap each other to form close joints between the members of the pan, combined with a handle attached to the lower pan-section, a clip-plate attached to the upper pan-section and pivoted to the handle, and a spring bearing against the handle and the clip-plate to normally depress the upper pan-section upon the lower pan-section, substantially as described.

In testimony that I claim the foregoing as my own I have hereto affixed my signature in the presence of two witnesses.

HENRY KOHLMYER.

Witnesses:
T. F. DANIEL,
E. A. BRAUN.